United States Patent [19]

Imgram

[11] 4,440,712
[45] Apr. 3, 1984

[54] PROCESS FOR THE PREPARATION OF SHAPED ARTICLES

[76] Inventor: Friedrich Imgram, Am Frankfurter Weg 2, D 6056 Heusenstamm, Fed. Rep. of Germany

[21] Appl. No.: 342,759

[22] Filed: Jan. 26, 1982

[30] Foreign Application Priority Data

Jan. 26, 1981 [DE] Fed. Rep. of Germany ....... 3102475

[51] Int. Cl.³ .............................................. B29C 27/20
[52] U.S. Cl. ................ 264/209.5; 264/209.6; 264/210.5; 264/210.6; 264/211; 264/230; 264/269; 264/285; 264/295; 264/339; 264/342 R
[58] Field of Search ................... 264/230, 211, 342 R, 264/22, 285, 209.5, 209.6, 269, 210.6, 210.5, 173, 339, 295; 428/35

[56] References Cited

U.S. PATENT DOCUMENTS

| | | | |
|---|---|---|---|
| 3,050,786 | 8/1962 | St. John et al. ...................... | 264/230 |
| 3,448,182 | 6/1969 | Derbyshire et al. ................. | 264/230 |
| 3,526,683 | 9/1970 | Heslop et al. ........................ | 264/230 |
| 3,568,311 | 3/1971 | Lawton ................................. | 264/230 |
| 3,939,243 | 2/1976 | Dawson ............................... | 264/230 |
| 3,962,766 | 6/1976 | Pompidor et al. .................. | 264/230 |
| 3,972,548 | 8/1976 | Roseen ............................ | 264/342 R |
| 4,097,573 | 6/1978 | Parmann ............................. | 264/339 |
| 4,236,953 | 12/1980 | Takahashi ........................... | 264/173 |
| 4,309,807 | 1/1982 | Hill et al. ............................ | 264/230 |
| 4,336,222 | 6/1982 | Prohn ................................. | 264/339 |

FOREIGN PATENT DOCUMENTS

| | | | |
|---|---|---|---|
| 2427580 | 1/1975 | Fed. Rep. of Germany ...... | 264/230 |
| 55-100128 | 7/1980 | Japan .................................. | 264/230 |
| 56-27317 | 3/1981 | Japan ............................... | 264/209.5 |

*Primary Examiner*—Jeffery R. Thurlow
*Attorney, Agent, or Firm*—Schwartz, Jeffery, Schwaab, Mack, Blumenthal & Koch

[57] ABSTRACT

Shaped articles, particularly tubular shaped articles, are formed by a process comprising molding a crosslinkable synthetic plastic material into a first molded shape, crosslinking the plastic material at a temperature in excess of the crystalline melting point of the material, subjecting the crosslinked first shape to a working operation to form a second configuration shape and subjecting specific areas of the second shape to a heat treatment thereby forming a deformation in the specific area. Extruded tubular materials subjected to a stretching operation tend to seek their original shape upon heat treatment thereby making the degree of deformation possible nearly equal to the degree of stretching.

13 Claims, 9 Drawing Figures

PROCESS FOR THE PREPARATION OF SHAPED ARTICLES

BACKGROUND OF THE INVENTION

1. Field of the Invention

The invention concerns a process for the preparation of a definite shape of cross-linked synthetic plastic materials including tubular shapes. The plastics utilized include, in particular, polyethylene in its many forms such as low density polyethylene (LDPE), medium density polyethylene (MDPE), and (HDPE) high density polyethylene, polymethacrylate (PMMA), polyvinylacetate (PVA), polymethylacrylate (PMMA), polyvinylchloride (PVC) and ethylenevinylacetate (EVA).

2. Background of the Prior Art:

Synthetic products and in particular synthetic plastic tubing are being used increasingly, for example, in the field of heating and sanitation. These materials have outstanding long term stability even at high temperatures and pressures and are resistant to most of the substances that are utilized or added to heating and sanitation systems. If, for example, the tubing is exposed to extreme bending during installation, in order perhaps to be built into an assembly after being equipped with fittings, the pipes must be fastened and possibly cast in the bent state as relatively strong restoring forces are present in the pipes and tubing and are highly resistant to extreme bending. If a pipe of this type is subjected to angling, for example, a kinking location with a reduced cross section is formed resulting in an area of increased resistance to flow.

Certain subsequent deformations of the molded material cannot be effected without residual stresses, other deformations can be effected only with great difficulty.

SUMMARY OF THE INVENTION

The above-described problem is solved by the process of this invention wherein following the completion of an initial shaping step (A) of the plastic material and a subsequent cross-linking step at temperatures exceeding the crystalline melting point of the material involved, a second shaping step is effected. The second shaping process has a predetermined relationship to the initial shaping. The synthetic plastic product is then subjected to a partial heat treatment at predetermined locations in order to obtain a specific deformation of the shaped product. The magnitude of this deformation lies between the magnitude of the first and the magnitude of the second shaping step. The cross-linking following the shaping step is effected by chemical or physical means.

In a preferred embodiment, the second shaping step is obtained by a reduction of the first deformation by at least 10%, preferably 20%.

In a further embodiment of the invention, the molding compound premixed with cross-linking agents, additives and auxiliary substances is exposed in a known manner to a short term, high pressure treatment in order to obtain adequate cross-linking, followed by an extrusion process such as the type well known for producing pipes, with the mixture being cooled immediately after the deformation and subsequently stretched by at least 10%, preferably 20% in the longitudinal direction of the pipe.

Examples of suitable, synthetic plastics, cross-linking agents, additives and the like are known in the art and are also described in numerous references such as the *Textbook of Polymer Science*, by F. W. Billmeyer, Jr., John Wiley and Sons, New York, 1962, 601 pp, and *Principles of Polymer Chemistry*, by P. S. Flory, Cornell University Press, Ithaca, New York, 1953, 672 pp, the pertinent portions of which are incorporated herein by reference.

According to the invention, the partial heat treatment of the synthetic plastic product is effected at a temperature higher than the crystalline melting point of the substance involved, while the adjacent parts of the produce remain in the crystalline state. The heat treatment of the synthetic plastic product is effected preferably with the aid of a flow of air at a temperature in excess of 140° C.

In order to produce a permanent expansion, bend or angle of the shaped article, for example, a pipe formed and stretched according to the invention, the stretched pipe is heated partially at the locations to be deformed.

In a further development of the invention, tubular shapes of cross-linked thermoplastic and high molecular weight synthetics of the above-mentioned type are proposed, wherein the pipe bends and/or pipe expansions and/or pipe angles in their areas of locally increasing or decreasing deformation have correspondingly increasing or decreasing radii and wall diameters compared with the undeformed tubular parts of the shape. This results in the fact that the internal diameter of the pipe is larger at the pipe bends or angles than in the straight sections, while the wall thickness in said areas is also larger in a desirable and advantageous manner. These tubular expansions act to eliminate any additional flow resistance such as those occurring in bent pipes of the conventional type, while simultaneously the material of the wall is reinforced in the curving sections exposed to a higher stress.

According to the invention, tubular shapes may be produced which exhibit within a section of the tubular shape a zone expanded about the entire circumference.

Further tubular shapes may be produced, for example, wherein a tubular section is developed as a Venturi tube with a narrowing and subsequently gradually expanding tubular section. Flange connections may also be effected with different terminal expansions.

Examples of experiments in the production of a certain deformation of a cross-linked material of the above-described type will be presented hereinafter in the following and in the description illustrated by the drawings:

EXAMPLE

Finely divided polyethylene is mixed with 2.5% by weight dicumyl peroxide and the mixture is inserted in a pressure chamber and exposed to high pressure. The temperature of the material at the outlet of the pressure chamber is approximately 110° C. The material is passed through the conduits of an extrusion installation and is then heated to approximately 160° C. At this temperature, the cross-linking reaction procedes rapidly and completely. A pipe of cross-linked polyethylene is obtained at the outlet of the shaping tool. The pipe is continuously drawn in the same working process through a shaping tool and subsequently through a water bath, and cooled. The shaping tool effects a reduction in radius by at least 10%, preferably 20%. Let the original shape be A, then the reduced shape is $$B = A - \Delta A,$$

wherein ΔA is between 10% and 20%.

BRIEF DESCRIPTION OF THE DRAWINGS

The invention shall become more apparent with the aid of the drawing: In the drawing

DETAILED DESCRIPTION OF THE EMBODIMENTS

Figure 1:
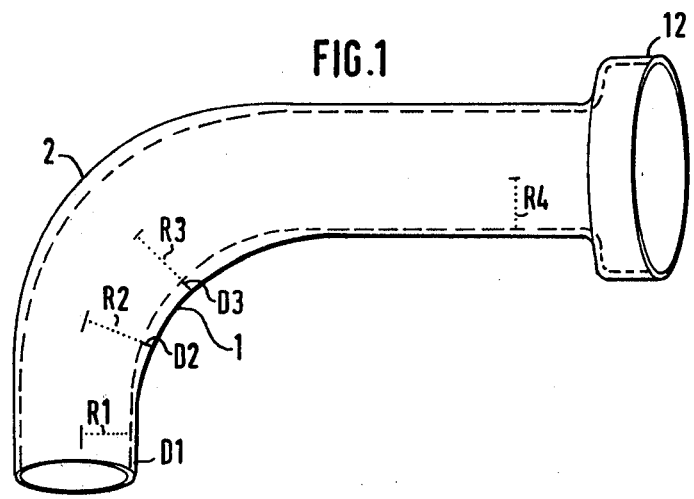
FIG. 1 shows an angled tubular section with a flange element.

If, for example, an angular deformation is to be effected, such as that shown in FIG. 1, the side 1 of the pipe produced by the above-described process is exposed to a flow of hot air at a temperature in excess of 140° C. for a certain period of time. In the course of this heating, an expansion of the cross section takes place, whereby the material is tending to assume the original shape A. If the circumferential configuration of the pipe is heated nonuniformly, the pipe will be angled, as the pipe by virtue of the memory effect known in itself, tends to assume its original thickness on the side 1 of the circumference, while on the cooler side 2, this state can no longer be attained. By this heating process, the radius R 1 of the pipe, reduced by 10% to 20%, is expanded to R 2 and finally to R 3, while the radius R 4 is again identical with R 1. The same is true for the wall thickness D 1 of the original wall again reduced by 10% to 20%. The wall thickness D 3 is thus in approximate agreement with the original wall thickness and the latter is greater than D 2 and D 2 is greater than the wall thickness D 1. In this manner, greater radii and wall thicknesses are obtained at the angle locations so that the flow loss otherwise occurring in angle pieces as the result of narrowing, is avoided. The reduction of a pipe produced, for example, by extrusion may be continued by its yield strength so that by means of a corresponding later heat treatment the original state may be restored in the same order of magnitude.

The angle piece produced in this manner has a permanent shape without the action of restoring forces and thus of stresses.

The flange part 12, also shown in FIG. 1, is produced in a similar manner.

A further field of application consists of coating metal pipes on the inside with a synthetic plastic material for example to seal damaged or porous locations in pipes already installed.

For this purpose, a polyethylene pipe produced, for example, by the above-described process is reduced by the extrusion process, for example, by 10%, so that the pipe reduced in this manner may be introduced in the metal pipe to be repaired. The length of the pipe to be inserted is chosen so that the tubular parts to be repaired are bridged over by adequate lengths. Following the introduction of the plastic pipe, the combination of pipes is heated so that the plastic inner pipe will expand by the amount of the reduction and will be in tight contact with the inner wall. The heat treatment generates forces sufficient to provide adequate sealing of the plastic pipe over its entire circumference and in a sufficient length on the inner wall of the pipe to be repaired.

Figure 2:
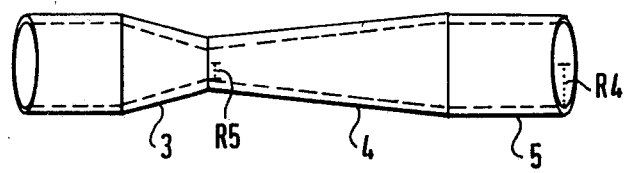
FIG. 2 shows a Venturi tube.

A further field of application is the production of Venturi tubes from a tubular section. A tube of this type is shown in FIG. 2. A Venturi tube consists of a narrowing tubular part 3 and the gradually reexpanding part 4. Starting with an initial pipe 5 with a radius of R 4 and reducing such a pipe to a radius of R 5 leads to the production in a simple manner by means of subsequent heat treatments of the narrowing tubular sections 3 and the gradually expanding sections 4. At the narrowing locations, the wall thickness is increasing and is the largest at the narrowest point with the radius R 5. The highest stresses in the pipe are also found here.

For the production of other desirable deformations of suitably reduced pipes or hose, appropriately shaped dies may be used into which the tubular sections are placed and subsequently heated until they have assumed the configuration given by the shape of the dies. In this manner, accurately reproducible deformations may be effected so that the mass production of preformed tubular sections or the like is possible without difficulty without the accurate observation for predetermined dimensions.

The measures according to the invention may also be of advantage in the production of connections with fittings and pipe connectors so that in some cases no gaskets are required. It is sufficient to use slightly reduced tubing which is suitably heated at connecting locations so that a predetermined adaptation is achieved by means of the heat treatment.

The invention may be applied advantageously to the production of piping systems equipped in the form of double pipes with gas insulating chambers, preferably air chambers. Examples of this embodiment are shown in FIGS. 3 and 4.

Figure 3:
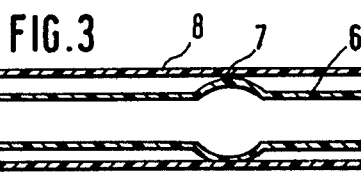
FIGS. 3 and 4 illustrate a double tubular section with internal spacing rings and external rings respectively.
Figure 4:
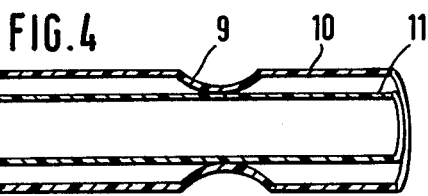
Figure 5A:
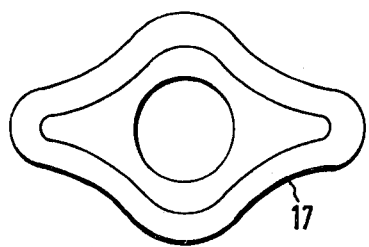
FIGS. 5a-5e show a pipe and T-connection.
Figure 5D:
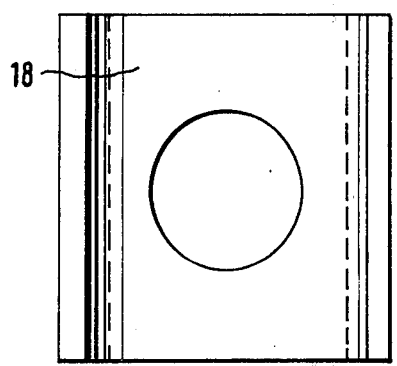
Figure 5B:
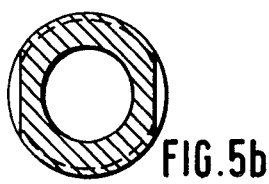
Figure 5C:
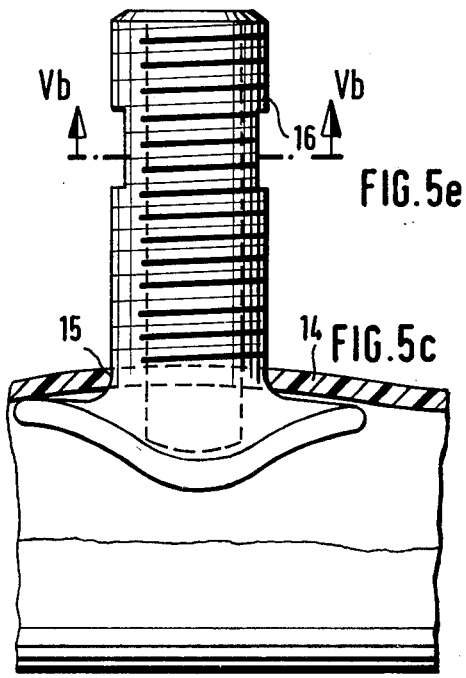
Figure 5E:
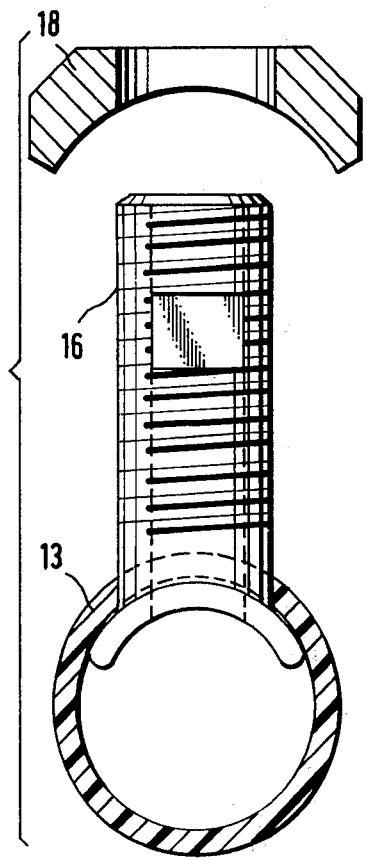

As seen in FIG. 3, expansions 7 are provided a predetermined intervals on the circumference of the pipe 6 which in the installed state have the configuration inside the external pipe 8 of bearing supports and gaskets. In this manner, a plurality of gas chambers is formed between successive expansions, providing excellent insulation.

In a similar manner, indentures 9 may be formed in a predetermined spacing in the external pipe 10, which in the mounted state serve as bearing supports and gaskets for the inner pipe 11. Such an embodiment is shown in FIG. 4.

The undeformed pipe may consist of a synthetic plastic or a metal.

FIG. 5 shows a T-connection comprising a hose connection 16, which is passed with its shape 17 through a bore 15 of the tubular section 13. With the aid of a pressure member 18 and screw elements, not shown, the hose connection 16 is clamped together with the tubular section 13 to form a T-connection. The hose connector 16 is provided with threads so that the pressure member is clamped against the tubular section 13, wherein the shape 17 inside the tubular section renders such a clamping possible. The T-connection is established by heating the corresponding tubular section so that the heated part assumes its original shape. The bore 15 is then prepared with dimensions corresponding to the diameter of the hose connection 16. The hose connection 16 is integrally joined with the shape 17 and by virtue of its oval shape this element is passed through the still warm border of the bore 15 with the tubular section 13 fully contacting the shape 17 after cooling. Following the cooling of the vicinity of the bore hole the pressure member is passed over the hose connection 16 and tightened by means of the screw elements, thereby producing a positive and tight T-connection.

The tubular section 13 may be shaped so that only a slight or no flow resistance is generated in the tubular section 13.

A particular advantage of the process consists of the fact that a T-connection may be established with already installed lines without having to dismantle them. The hose connector 16 here consists preferably of metal, together with the pressure member 18 and the screw elements, not shown.

What is claimed is:

1. A process for the preparation of shaped articles from crosslinkable synthetic plastic materials comprising:

molding a crosslinkable synthetic plastic material into a first configuration;

crosslinking said crosslinkable synthetic plastic material at a temperature in excess of the crystalline melting point of said material;

working said crosslinked first configuration into a second configuration having a predetermined relationship to said first configuration;

subjecting specific areas of said second configuration to a localized heat treatment to obtain a deformation in said specific areas of said second configuration without a return to said first configuration of said article, wherein the magnitude of deformation of the final configuration is between the magnitude of deformation of said first configuration and the magnitude of deformation of said second configuration.

2. The process of claim 1, characterized in that said crosslinking step is effected by chemical or physical means.

3. The process of claim 1, characterized in that said working step is effected by reducing said first configuration by at least 10%.

4. The process of claim 1, characterized in that said working step is effected by reducing said first configuration by at least 20%.

5. The process of claim 1, wherein said molding step is performed at high pressure.

6. The process of claim 5, wherein said working step is an extrusion process for producing tubular articles.

7. The process of claim 6, wherein said extrusion process includes cooling after shaping and drawing of the shaped article by at least 10% in the longitudinal direction of said tubular article.

8. The process of claim 7 wherein said drawing is 20% in the longitudinal direction of said tubular article.

9. The process of claim 8, wherein said crosslinkable synthetic plastic material is selected from the group consisting of crosslinkable polyethylene, polymethacrylate, polyvinylchloride, polyvinylacetate, and ethylene vinyl acetate.

10. The process of claim 9, wherein said crosslinkable synthetic plastic material further comprises crosslinking agents and adjuvants.

11. The process according to claims 1 or 10, characterized in that the localized heat treatment of said second configuration is effected at a temperature higher than the crystalline melting point of the plastic material while adjacent parts remain in the crystalline state.

12. The process according to claim 11, characterized in that the localized heat treatment of said second configuration is effected by means of a flow of air at a temperature in excess of 140° C.

13. The process according to claim 11, characterized in that said localized heat treatment produces a permanent expansion, bend or angle, in said second configuration.

* * * * *